Patented Oct. 9, 1923.

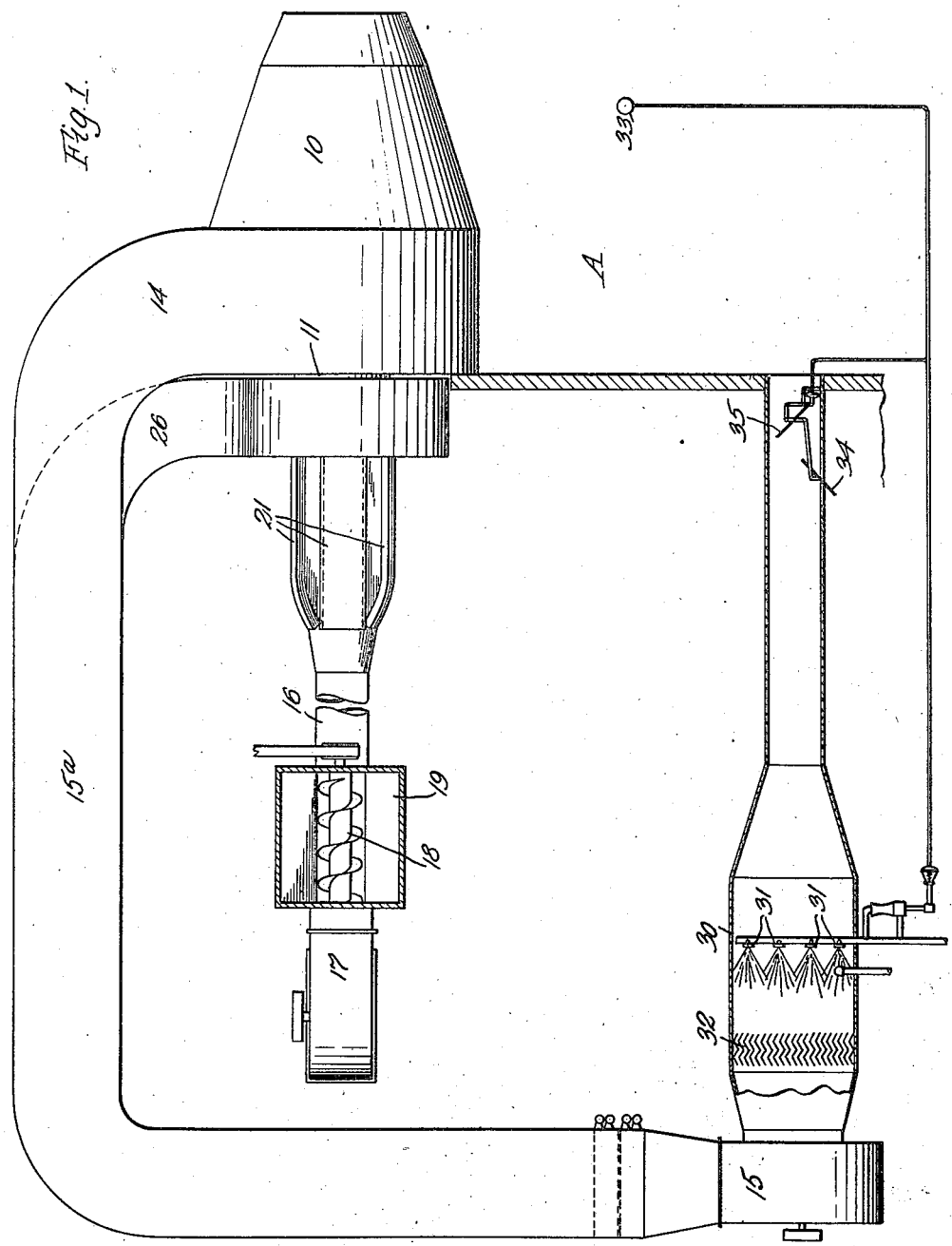

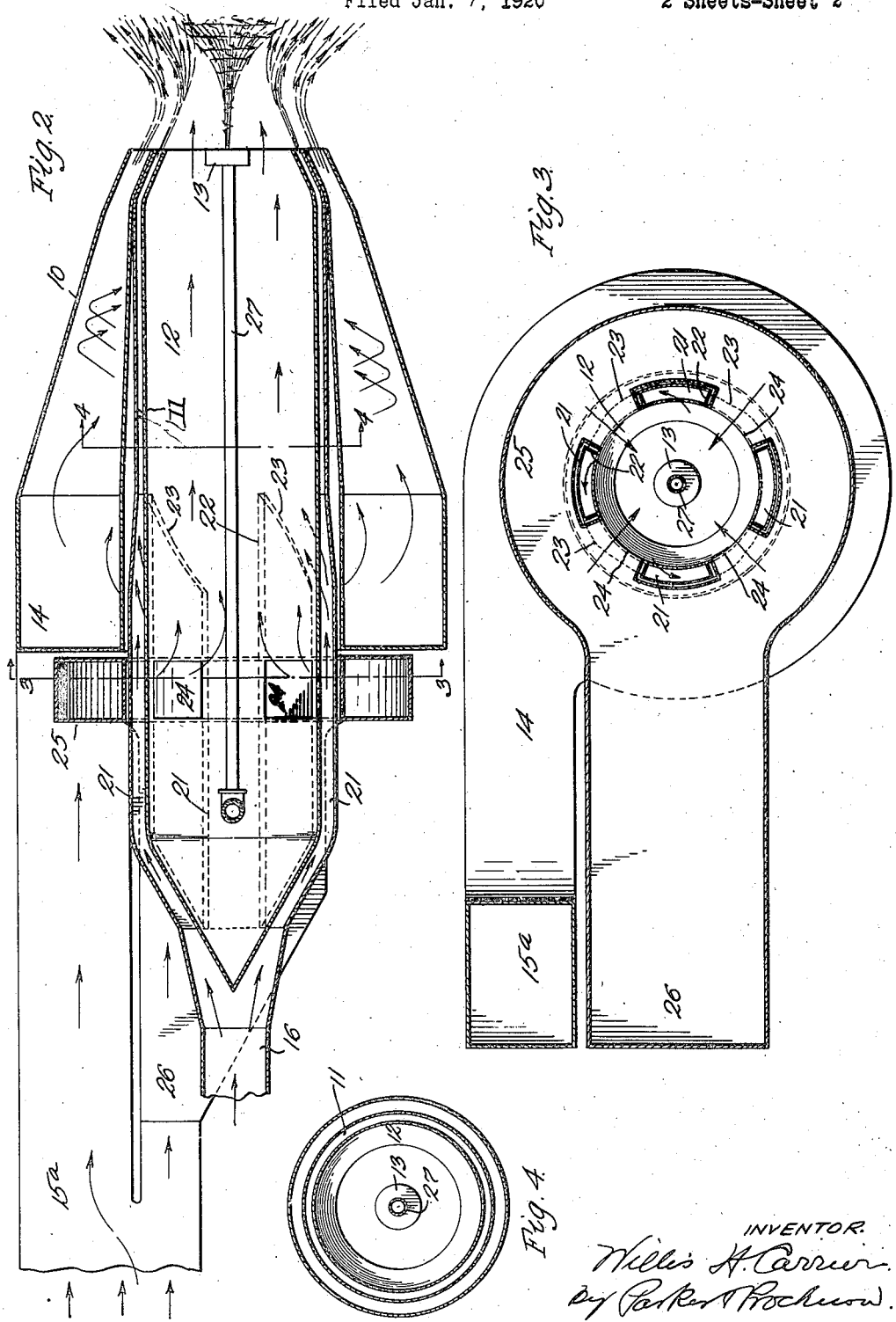

1,469,993

UNITED STATES PATENT OFFICE.

WILLIS H. CARRIER, OF NEW YORK, N. Y., ASSIGNOR TO CARRIER ENGINEERING CORPORATION, OF NEW YORK, N. Y.

METHOD OF AND APPARATUS FOR ADDING MOISTURE TO POWDERED MATERIALS.

Application filed January 7, 1920. Serial No. 350,052.

*To all whom it may concern:*

Be it known that I, WILLIS H. CARRIER, a citizen of the United States, residing at New York, in the county of New York and State of New York, have invented a new and useful Improvement in Methods of and Apparatus for Adding Moisture to Powdered Material, of which the following is a specification.

This invention relates to a method of and apparatus for adding moisture to powdered materials. Some powdered materials, such, for instance, as the powdered gums used for making mucilage, have a considerable affinity for moisture and will take up more or less moisture from the atmosphere if exposed. While some moisture in the material is desirable, it should not be sufficient to cause the powder to adhere or cake, and the material should have only the requisite amount of moisture uniformly distributed throughout the mass. Such materials are commonly packed in barrels or receptacles and allowed to stand for a period of time to take up moisture from the atmosphere, but this method is very unsatisfactory and wasteful because the moisture content cannot be definitely controlled in this way, and if the conditions are not right the distribution of moisture through the material may not be uniform and the powder may become caked. Another objection is the great amount of storage space required by the manufacturer for the exposure of the material.

The object of this invention is to produce an efficient, practical method and apparatus, whereby moisture can be uniformly added to dry powdered materials so as to give the materials a definite predetermined or required moisture content without wetting or moistening the material to such as extent as to cause the powder to adhere or cake.

In accordance with the preferred embodiment of the invention herein described, the dry, powdered material is blown or discharged in the form of an annular or hollow blast or jet, and preferably with a whirling or rotary motion into a conditioning chamber. Water is discharged, preferably spirally, in a very fine spray or mist within the annular blast of air and powdered material, and air having a suitable regulated humidity is discharged into the conditioning chamber, preferably inside of and outside of or around the annular blast of powdered material, the outside or enveloping air being also preferably caused to whirl or rotate with the whirling annular blast of air and powdered material. A very intimate and uniform mixture or contact of the powdered material with the humidified air and spray is thus caused and the powdered material takes up moisture from the air, the moisture taken from the air being replaced by moisture from the water spray. By regulating the humidity of the air, the weight of water added to the material can be controlled with a nicety so that the material will have a predetermined definite moisture content without being wet. After treatment in this manner the material still retains its powdered condition and is not moist or wet enough for the particles to adhere together or cake. The powdered material can be in this manner moistened uniformly throughout accurately to the predetermined, desired degree in a short space of time. This avoids the necessity of the manufacturer keeping large quantities of the powdered material in storage for the much longer period of time required for it to take up the necessary amount of moisture from the atmosphere as heretofore ordinarily practiced. The method will be further explained in connection with the description of the construction and operation of the apparatus.

In the accompanying drawings:

Fig. 1 is a diagrammatic plan view of an apparatus embodying the invention, for adding moisture to powdered material.

Fig. 2 is a longitudinal sectional elevation on an enlarged scale, of the discharge nozzle or device for causing the mixture of the powdered material with the water spray and air.

Figs. 3 and 4 are transverse sectional elevations thereof on lines 3—3 and 4—4, Fig. 2.

In the preferred embodiment of the invention illustrated in the drawings, the powder, air and water or liquid are blown into a conditioning chamber A from a nozzle or discharge and mixing device comprising an exterior annular air nozzle 10, an intermediate annular powder and air nozzle 11, an interior air nozzle 12, and a water spray nozzle 13, all arranged concentrically so as to discharge the air, powder and water in concentric blasts. The exterior nozzle preferably tapers towards its discharge end and the intermediate and inner nozzles are preferably contracted or tapered somewhat at their discharge ends. The blast of powder issuing from the intermediate nozzle and the air delivered by the exterior nozzle are preferably caused to whirl or rotate by suitable means. For this purpose, in the construction shown, the air is admitted tangentially by a duct 14 to the large end of the exterior nozzle so that it is caused to rotate or whirl in the exterior nozzle and issue therefrom in a whirling, annular column or blast around the blast of powder and air issuing from the intermediate nozzle 11. The air is supplied to the duct 14 by a suitable fan or air propelling device 15, Fig. 1, through a main duct or passage 15ª.

16 represents a supply duct for the powdered material and air to the intermediate nozzle. The air is propelled through this duct by a suitable fan or propelling device 17 and the powdered material is supplied to this duct so as to be carried along by the air in any suitable manner, as for instance by a screw conveyor 18, which delivers the powdered material from a hopper or container 19 into the duct 16. The duct 16 is provided with a plurality of, preferably four, longitudinal branches or passages 21, which extend lengthwise between the interior and exterior nozzles 12 and 10, and connect with the inner end or portion of the intermediate powder nozzle 11. As shown, the discharge end of each of the branch ducts 21 is provided at one side with a straight side wall 22, and at the opposite side with an oblique side wall 23 which recedes from the side wall 22 toward its point of connection with the inner end of the intermediate nozzle. The discharge ends of the branch ducts or passages 21 are also preferably reduced or tapered gradually toward their junctions with the intermediate nozzle so that their discharge ends are of greater width but less radial depth than the body portions of the branch ducts or passages 21. This formation of the discharge ends of the branch ducts causes the powder ladened air delivered by them to rotate or whirl in the intermediate nozzle and discharge therefrom with a whirling motion. The intermediate nozzle and the supply duct or passages therefor can be constructed and arranged in any other suitable manner to cause the powdered material to discharge from the nozzle 11 in a spiral or whirling blast.

The air preferably passes through and discharges from the interior nozzle 12 in a straight course. As shown, the air is delivered to this interior nozzle through openings 24 from an annular chamber 25 surrounding the inner end of the nozzle. These openings, four of which are shown, are located between the branch powder ducts or passages 21. Air is supplied to the annular chamber 25 by a branch 26 of the main air duct 15ª.

27 represents a water or liquid supply pipe leading to the spray nozzle 13. The water is supplied under the requisite pressure to cause the nozzle 13 to produce a very fine spray or mist. The spray nozzle shown is of a well known type adapted to produce a fine spiral spray. The pipe 27 is shown as extending lengthwise centrally through the interior air nozzle 12, but it can be arranged in any other suitable manner and the spray nozzle can be of any suitable kind.

The water from the spray nozzle 13 bursts into a very fine, spiral spray or mist within the annular blast or column of powder-ladened air which discharges from the intermediate nozzle 11 and which is confined around the water spray by the rotating, annular column or blast of air from the exterior nozzle 10. As a result of the spiral spray, the rotating blasts of powder-laden air and surrounding air and the straight blast of air issuing from the interior nozzle 12, the powder, water spray and air are very actively agitated and commingled. A very uniform and thorough mixture or contact of the powder, liquid spray and air is produced with the result that the addition of moisture is uniform throughout the powder. The water spray supplies humidity or moisture to the air as the same is taken from the air by the powder and there is thus always adequate moisture for moistening the powder.

In order to control the amount of moisture added to the powder, the humidity of the air supplied to the exterior and interior nozzles 10 and 12 is preferably regulated automatically so as to give the air a predetermined definite humidity, depending upon the results desired. This can be done by air conditioning and humidity regulating means of any suitable or known kind. For instance, as indicated in Fig. 1, the air is delivered to the main supply duct 15ª from a humidifier or air conditioner 30, in which the air is humidified or conditioned as required by contact with water spray from nozzles 31, the free particles of entrained moisture being removed from the air as usual by an eliminator 32. The humidity of the air delivered by the humidifier 30 is regulated, for instance, by a hygrostat 33 which responds to changes in humidity in the powder conditioning chamber and actuates fresh air and return air dampers 34 and 35 in the air supply conduit of the humidifier, whereby more or less fresh air and return air from the powder moistening chamber A are admitted to the humidifier. The hygrostat could also effect the desired regulation of the humidity by controlling the temperature or volume of the spray water in the humidifier 30, either alone or in conjunction with the regulation of the fresh and return air, or the humidity of the air delivered from the humidifier to the powder moistening nozzle or device could be regulated in any other known or suitable manner, enabling air of a predetermined definite humidity to be delivered to the powder moistening chamber.

Heretofore it has not been considered practicable to moisten powdered materials of the kind mentioned by means of a liquid spray, and in so far as I am aware, it has not been done commercially prior to my invention. The liquid cannot come into contact with the powdered material until it has been atomized into an extremely fine state, otherwise the material would gum up and the moisture would not be uniformly distributed. The hereindescribed method prevents any possible contact of the liquid and powder until after thorough atomization of the liquid and until the powdered material is thoroughly broken up and distributed by the air.

I claim as my invention:

1. The hereindescribed method of increasing the moisture content of powdered material without changing the material from a substantially dry powdered condition, consisting in producing a blast of the powdered material, discharging liquid in a fine spray in proximity to the blast of powdered material, and forming a layer of air between the powdered material and the liquid spray whereby the air prevents direct contact of the liquid spray with the powdered material and said air is humidified by said liquid spray, and the powdered material takes up moisture from said air.

2. The hereindescribed method of increasing the moisture content of powdered material without changing the material from a substantially dry powdered condition, consisting in producing a hollow blast of the powdered material, discharging liquid in a fine spray within said hollow blast of powdered material, and producing a hollow blast of air around the liquid spray and between the same and the powdered material, whereby the air prevents direct contact of the liquid spray with the powdered material and said air is humidified by said liquid spray, and the powdered material takes up moisture from said air.

3. The hereindescribed method of increasing the moisture content of powdered material without changing the material from a substantially dry powdered condition, consisting in producing a hollow blast of the powdered material, discharging liquid in a fine spray within said hollow blast of powdered material, producing a hollow blast of air around the liquid spray and between the same and the powdered material, whereby the air prevents direct contact of the liquid spray with the powdered material and said air is humidified by said liquid spray, and the powdered material takes up moisture from said air, and enveloping and confining said blast of powdered material by a current of air.

4. The hereindescribed method of increasing the moisture content of powdered material without changing the material from a substantially dry powdered condition, consisting in producing a hollow blast of the powdered material, enveloping said blast of powdered material by a current of air, discharging liquid in a fine spray within said hollow blast of powdered material, and preventing direct contact of the liquid spray with the powdered material.

5. The hereindescribed method of increasing the moisture content of powdered material without changing the material from a substantially dry powdered condition, consisting in producing concentric blasts of air, discharging the powdered material in a hollow blast between said concentric air blasts and discharging liquid in a fine spray into said inner air blast.

6. The hereindescribed method of effecting a definite increase in the moisture content of powdered material without wetting the material, consisting in producing a whirling hollow blast of the powdered material and of air having a regulated condition of humidity, and discharging liquid in a fine spray within said whirling hollow blast of air and powder.

7. The hereindescribed method of increasing the moisture content of powdered material without changing the material from a substantially dry powdered condition, consisting in producing concentric blasts of air and the powdered material, the powdered material being blown between inner and outer air blasts, causing said blast of powdered material and outer air blast to rotate, and discharging liquid in a fine spray into said inner air blast.

8. The hereindescribed method of increasing the moisture content of powdered material consisting in producing a straight air blast and a surrounding rotating air blast, blowing the powdered material between said inner and outer air blasts and causing the rotation of said blast of powdered material, and discharging liquid in a fine spray into said inner air blast.

9. The hereindescribed method of increasing the moisture content of powdered material consisting in producing a straight air blast and a surrounding rotating air blast, blowing the powdered material between said inner and outer air blasts and causing the rotation of said blast of powdered material, and producing a fine spiral spray of liquid in said inner air blast.

10. The hereindescribed method of increasing the moisture content of powdered material, consisting in producing a hollow blast of the powdered material and blasts of air inside and outside of said hollow blast of powdered material, causing said blast of powdered material and outer air blast to rotate, said outer air blast being unconfined and said powder blast being confined only by said air blasts and producing a fine whirling spray of liquid in said inner air blast.

11. The hereindescribed method of increasing the moisture content of powdered material without changing the material from a substantially dry powdered condition, consisting in producing a blast of the powdered material, discharging liquid in a fine spray in proximity to the blast of powdered material, forming a layer of air between the powdered material and the liquid spray, whereby the air prevents direct contact of the liquid spray with the powdered material and said air is humidified by said liquid spray, and the powdered material takes up moisture from said air, and regulating the humidity of the said air to control the amount of moisture added to the powdered material.

12. The hereindescribed method of adding moisture to powdered material, consisting in producing a blast of the powdered material, enveloping the said blast of powdered material with air, discharging liquid in a fine spray in proximity to said powdered material and air, and regulating the humidity of the air to control the amount of moisture added to the powdered material.

13. The hereindescribed method of adding moisture to powdered material, consisting in producing a blast of the powdered material, enveloping the said blast of powdered material with air, discharging liquid in a fine spray within said blast of powdered material, and regulating the humidity of the air to control the amount of moisture added to the powdered material.

14. The hereindescribed method of adding moisture to powdered material, consisting in producing a hollow blast of the powdered material, producing blasts of air inside of and outside of said hollow blast of powdered material, discharging liquid in a fine spray into said inner air blast, and regulating the humidity of the inner and outer blasts of air to control the amount of moisture added to the powdered material.

15. The hereindescribed method of adding moisture to powdered material, consisting in producing a hollow blast of the powdered material, producing blasts of air inside of and outside of said hollow blast of powdered material, causing said blast of powdered material and outer air blast to rotate, discharging liquid in a fine spray into said inner air blast, and regulating the humidity of the inner and outer blasts of air to control the amount of moisture added to the powdered material.

16. In an apparatus for increasing the moisture content of powdered material, the combination of concentric annular nozzles, means for discharging powdered material and air respectively from the inner and outer annular nozzles, said inner nozzle extending substantially to the discharge end of said surrounding nozzle, means for producing a blast of air inside of said blast of powdered material, and means for discharging liquid in a fine spray into said inner blast of air.

17. In an apparatus for increasing the moisture content of powdered material, the combination of concentric interior, intermediate and exterior nozzles, said intermediate nozzle extending substantially to the discharge end of said exterior nozzle, means for discharging air from said interior and exterior nozzles, means for discharging the powdered material from said intermediate nozzle, and means for discharging liquid in a fine spray into the blast of air from said interior nozzle.

18. In an apparatus for increasing the moisture content of powdered material, the combination of concentric inner and outer annular nozzles, means for discharging the powdered material and air respectively from said inner and outer nozzles, said inner nozzle extending substantially to the discharge end of said surrounding nozzle, means for causing the blasts of powdered material and air to rotate, and means for discharging liquid in a fine spray within the hollow blast of powdered material.

19. In an apparatus for increasing the moisture content of powdered material, the combination of an annular nozzle, means for discharging powdered material from said nozzle into a relatively unconfined space and causing the hollow blast of powdered material to rotate, means for producing a blast of air outside of said hollow blast of powdered material, and means for discharging liquid in a fine spray into the space within said hollow blast of powdered material.

20. In an apparatus for increasing the moisture content of powdered material, the combination of concentric interior, intermediate and exterior nozzles, means for discharging powdered material from said intermediate nozzle, means for discharging air from said interior and exterior nozzles, said nozzles discharging the powder and air into a relatively unconfined space, means for causing the blasts of powdered material and air from said intermediate and exterior nozzles to rotate, and means for discharging liquid in a fine spray into the blast of air from said interior nozzle.

21. In an apparatus for adding moisture to powdered material, the combination of a nozzle, means for discharging powdered material from said nozzle, means for discharging liquid in a fine spray in proximity to said blast of powdered material, and means for regulating the humidity of the air enveloping the powdered material to control the amount of moisture added to the powdered material.

22. In an apparatus for adding moisture to powdered material, the combination of means for producing contiguous blasts of the powdered material and air, means for discharging liquid in a fine spray in proximity to said blast of powdered material, and means for regulating the humidity of the air blast to control the amount of moisture added to the powdered material.

23. In an apparatus for adding moisture to powdered material, the combination of means for producing a hollow blast of the powdered material, means for producing blasts of air inside of and outside of said hollow blast of powdered material, means for discharging liquid in a fine spray into the space within said hollow blast of powdered material, and means for regulating the humidity of the air to control the amount of moisture added to the powdered material.

Witness my hand this 2d day of January 1920.

WILLIS H. CARRIER.

Witnesses:
RUSSELL T. TREE,
K. BERENSMANN.